United States Patent [19]
Pepi

[11] 3,730,473
[45] May 1, 1973

[54] PNEUMATIC SELF-POSITIONING SHOCK AND VIBRATION ISOLATION STABILIZING ABSORBER

[75] Inventor: Jerome S. Pepi, Chelmsford, Mass.

[73] Assignee: Barry Wright Corporation, Watertown, Mass.

[22] Filed: Mar. 3, 1972

[21] Appl. No.: 231,494

Related U.S. Application Data

[63] Continuation of Ser. No. 21,144, March 19, 1970, abandoned.

[52] U.S. Cl. ........... 248/358 R, 137/627.5, 267/65 D, 267/122, 267/136
[51] Int. Cl. ........... F16f 9/04, F16f 9/34, F16f 15/02
[58] Field of Search ................... 137/627.5; 267/65 C, 267/65 D, 65 R, 113, 118, 119, 122, 124, 136, 137

[56] References Cited

UNITED STATES PATENTS

| 1,215,947 | 2/1917 | McVoy | 137/627.5 X |
| 2,451,162 | 10/1948 | Gates | 137/627.5 |

*Primary Examiner*—Gerald M. Forlenza
*Assistant Examiner*—Howard Beltran
*Attorney*—Charles Hieken

[57] ABSTRACT

An isolation system including three discrete pneumatically controlled, self-positioning, shock and vibration isolators, each isolator including a chamber for air under pressure which acts as the isolator or load supporting chamber and provides an outlet to ambient, controlled by a position control valve. One wall of this chamber is formed with a tapered inlet opening to provide a valve seat for accommodating a ball inlet valve attached to a plunger of a height control valve. The other end of the plunger contains another ball serving as an air outlet valve, that is adapted to be seated in a tapered opening in the isolated body mounting. When the isolated body mounting moves inwardly into the chamber it presses on the upper ball to produce a force transmitted by the height control valve plunger upon the lower ball that opens the inlet valve to cause an increase of pressure in the chamber which serves to raise the isolated body mounting platform. When the platform rises, the outlet valve is opened by withdrawal of the outlet valve seat to reduce the pressure, and, in turn, causes the platform to again be urged inwardly into the chamber.

According to another aspect of the invention, there is a bias chamber for providing a downward force against the support piston and providing supply air to the height control valve, the pressure in the bias chamber being greater than the pressure in the load carrying chamber.

12 Claims, 2 Drawing Figures

INVENTOR
JEROME S. PEPI

INVENTOR
JEROME S. PEPI

PNEUMATIC SELF-POSITIONING SHOCK AND VIBRATION ISOLATION STABILIZING ABSORBER

This application is a continuation of my copending application Ser. No. 21,144, filed Mar. 19, 1970, now abandoned.

BACKGROUND OF THE INVENTION

The present invention relates in general to shock and vibration isolation and more particularly concerns a novel, pneumatic, self-leveling shock and vibration isolation system that not only provides vibration isolation, but also accurately maintains the isolated body at a predetermined average angular position relative to the local support structure about any horizontal axis, irrespective of sustained accelerations or load variations of the isolated body. These results are achieved with a rugged system capable of reliable operation for long periods of time under adverse conditions.

It is an important object of this invention to provide an improved shock and vibration isolator.

It is another object of the invention to achieve the preceding object pneumatically and with a self-positioning feature.

It is another object of the invention to achieve one or more of the preceding objects with a system capable of reliable operation over long periods of time under adverse conditions.

It is another object of the invention to eliminate a connecting conduit and ducted structure usually required for a position control valve employing a separate outlet chamber.

It is another object of the invention to reduce stress-producing forces.

It is another object of the invention to achieve position control with a valve that adds negligible stiffness to the isolator system.

It is another object of the invention to provide one or more of the preceding objects with a double-acting system.

SUMMARY OF THE INVENTION

According to the invention, there is load carrying chamber means enclosed in part by piston means, inlet valve means for selectively admitting fluid, such as air under pressure to the load carrying chamber means and outlet valve means for selectively releasing fluid under pressure from the load carrying chamber means. The piston means carries one of the valve means. The valve means each have movable elements mechanically interconnected by interconnecting means inside the load carrying chamber means for maintaining the movable elements in fixed relationship to one another. Relative displacement of the piston means causes one or the other of the valve means to open until the piston means assumes a predetermined position relative to the load carrying chamber means with both valve means just closed.

Another feature of the invention resides in having a bias chamber surrounding the piston means for carrying fluid under pressure that is greater than the pressure under the load chamber means to allow the use of the isolator in any attitude.

Numerous other features, objects and advantages of the invention will become apparent from the following specification when read in connection with the accompanying drawing, in which:

DETAILED DESCRIPTION OF PREFERRED EMBODIMENTS

Figure 1:
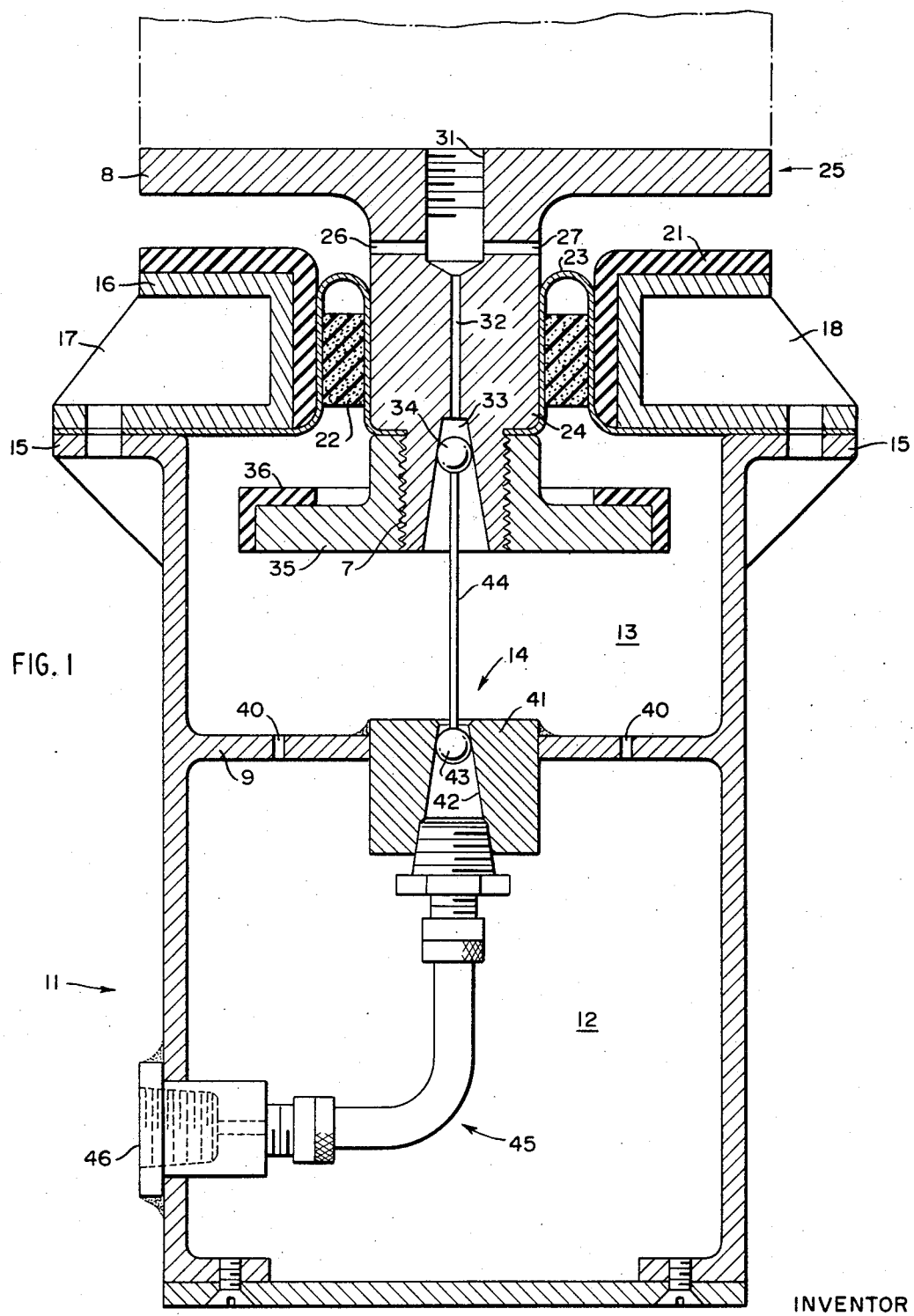
FIG. 1 is a longitudinal sectional view of a pneumatic self-positioning shock and vibration isolator according to the invention.

With reference now to the drawing and more particularly FIG. 1 thereof, there is shown a longitudinal sectional view of an embodiment of a pneumatic self-positioning shock and vibration isolator according to the invention. Since the embodiment exhibits circularly cylindrical symmetry, this view of the invention fully and adequately illustrates the embodiment. The hollow supporting cylinder 11 is divided into a lower chamber 12 and an upper load carrying member 13 separated by an annular shoulder 9 that carries lower valve 14, which serves as the inlet valve to chamber 13.

The upper flange 15 of cylinder 11 carries a member 16 of generally J-shaped cross section that is stiffened by trapezoidal ribs, such as 17 and 18. An elastomeric snubber 21 separates member 16 from the annular foam damper 22 and the rolling sleeve diaphragm 23 surrounding the central element 24 of piston 25.

Central element 24 is formed with a circular platform 8 for carrying the body to be isolated and with air exhaust passages such as 26 and 27, a threaded opening 31 to which the isolated body may be screwed, and upper valve outlet passage 32 for carrying air from the frustoconical lower opening 33 (which serves as a valve seat) when the spherical valve 34 is lowered in a manner to be described below.

The lower end of central portion 24 is threaded as at 7 to accommodate an internally centrally threaded lower disc 35 carrying an elastomeric snubber 36 around its outer periphery.

Lower air inlet valve 14 comprises a cylindrical plug 41 formed with a tapered opening or valve seat 42. A spherical ball valve 43 normally closes the opening into the upper load carrying chamber 13 and is connected to valve 34 by a plunger 44. A conventional hose and coupling assembly 45 carries air from air inlet 46 to inlet 42. Small diameter damping orifices 40, 40 between chambers 12 and 13 help provide damping.

Having described the physical arrangement of the structure, its mode of operation will be discussed. It is convenient to initially assume that the system is upright as shown with the upper and lower valves closed. This is the normal stable position of piston 25 relative to the hollow supporting cylinder 11. Now consider a situation when piston 25 rises slightly. The valve seat 33 is withdrawn from upper ball valve 34 to open the upper valve and allow air to pass out through opening 33, passage 32 and passages 26 and 27. This lowers the pressure in chamber 13 and reduces the force applied against disc 35 to cause piston 25 to move downward until ball 34 again closes the upper valve.

Now consider the situation when piston 25 moves downward slightly. Upper spherical valve 34, rod 44 and lower ball 43 then move downward together, thereby opening lower valve 14 and allowing compressed air from inlet 46 to enter the upper load carrying chamber 13 to produce an increase in the pressure upon disc 35 and that portion of piston 25 inside the load carrying chamber relative to that on the outside. Piston 25 will thereupon again move slightly upward until lower spherical valve 43 again closes the air inlet.

The embodiment of the invention represents an improvement over prior art self-positioning shock and vibration isolators in that the upper load carrying chamber 13 performs the function not only of acting as the isolator chamber, but also acting as the outlet chamber of the position control valve, thereby eliminating the need for connecting conduit and redundant structure ordinarily required for a position control valve employing a separate outlet chamber. The plunger 44 of the position control valve exerts a force against the piston 25 which is extremely small when compared with the forces exerted by a conventional system having a valve employing a flexible diaphragm as the movable wall of a separate valve outlet chamber. Furthermore, the position control valve adds only a very small stiffness to the effective isolator system stiffness as compared with the stiffness added by a valve employing a flexible diaphragm as the movable wall of a separate valve outlet chamber.

Figure 2:
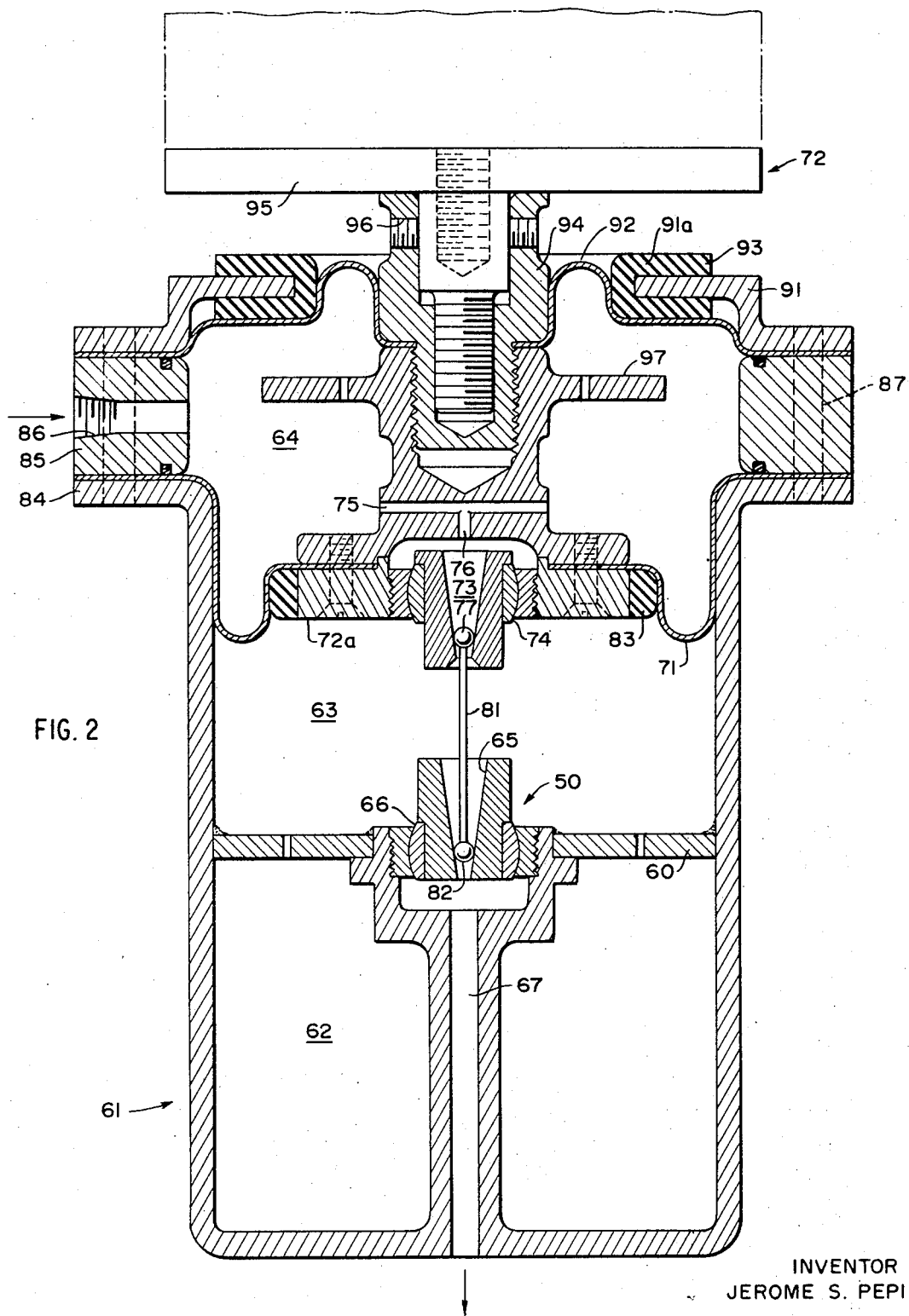
FIG. 2 is a longitudinal sectional view of a double-acting pneumatic self-positioning shock and vibration isolator according to the invention.

Referring to FIG. 2, there is shown still another embodiment of the invention comprising a double-acting, pneumatic, self-positioning shock and vibration isolator for supporting a load, such as a vibrating machine or the like, at a predetermined average position relative to the local support structure. This embodiment of the invention differs from the embodiment of FIG. 1 in that exhaust is through the lower valve and intake is through the upper valve from a bias chamber maintained at a pressure, preferably constant, higher than that in the load carrying chamber.

This embodiment of the invention is also shown in longitudinal section as a way that best and fully illustrates the invention. A hollow cylinder 61 comprises supporting structure and is divided into a lower compartment 62, an intermediate load carrying chamber 63 and an upper bias chamber 64.

An annular disc 60 separates lower chamber 62 from intermediate chamber 63. A lower exhaust valve 50 includes a lower exhaust orifice 65, which serves as a lower valve seat and is formed in a valve body 52 which is supported by means including a spherical ball joint 66 and communicates with an exhaust conduit 67. An upper inlet valve support assembly including a flexible rolling sleeve diaphragm 71 separates the intermediate load carrying chamber 63 from the upper bias chamber 64. The lower portion 72A of piston 72 carries an upper inlet valve 54 which includes a frustroconical orifice 73 which serves as an upper valve seat and is formed in a valve body 56 which is carried in a spherical ball joint 74. Orifice 73 communicates with bias chamber 64 through inlet passages 75 and 76.

In a manner similar to the embodiment of FIG. 1 there is an upper inlet spherical ball valve 77 connected by a rod 81 to a lower outlet spherical ball valve 82 that rides in the frustroconical exhaust orifice 65. It differs from the embodiment in FIG. 1 in that the embodiment of FIG. 1 had the positions on inlet and outlet valves reversed; that is to say, the inlet valve was at the bottom and the outlet valve was at the top.

An elastomeric annular ring 83 surrounds the lower portion 72A of piston 72 and is in contact with the lower rolling sleeve diaphragm 71.

Hollow support cylinder 61 is formed with an outwardly extending flange 84 at the top carrying an annular element 85. Annular element 85 is formed with an opening 86 that comprises an inlet for receiving a compressed air supply from an external source for charging bias chamber 64 and a number of circumferentially spaced openings like 87 for mounting support cylinder 61 to a support structure. Annular element 85 carries another annular element 91 having an inwardly extending raised ring portion 91A. A rolling sleeve diaphragm 92 is secured between elements 85 and 91 and extends partially around an elastomeric snubber 93. The snubber 93 engages the upper ring portion 91A of element 91 and a portion of rolling sleeve diaphragm 92. Rolling sleeve diaphragm 92 is also secured to the upper portion 94 of piston 72 to complete the sealing of the upper portion of bias chamber 64. Rolling sleeve diaphragm 71 is secured between the lower portion of element 85 and flange 84.

The platform 95 of piston 72 for carrying the body to be isolated is supported by means including an adjustable screw assembly having a thumb-screw 96 that permits the height of platform 95 relative to supporting cylinder 61 to be adjusted. The bottom of platform 95 then serves as a vertical undertravel stop while the inside annular shoulder 97 functions as a vertical overtravel stop for the piston 72, by contacting the upper and lower surface, respectively, of the elastomeric snubber 93.

Having described the physical arrangement of the structure, its mode of operation will be described. Compressed air enters through air supply inlet 86 into bias chamber 64. The pressure within bias chamber 64 exerts a downward force against the piston 72. The compressed air flows from chamber 64 to the upper height control valve through passages 75, 76 and 73. The pressure in the bias chamber 64 is greater than the pressure in the load carrying chamber 63, and the area of the air supply inlet 86 is preferably several times the area of the inlets 75 and 76 to the height control valve in order to obtain a stable control system.

This embodiment may be used in any direction in space if the downward force exerted by the bias pressure is greater than the weight of the isolated body. If the source of compressed air has sufficient flow capacity, the bias chamber will be maintained at constant pressure while providing air to the control valves at a rate necessary to achieve the desired speed of response of the height control system. Alternately, (not shown) flexible tubing sealed from the bias chamber may be arranged to provide air directly from the compressed air source to the position control valve at a pressure independent of the bias chamber pressure.

The pressurized air in inlet orifice 73 is enough to force ball 82 downward in exhaust orifice 65 to close that orifice. As piston 72 moves down in response to a downward force, such as that caused by adding a load, air enters load chamber 63 from bias chamber 64 through orifice 73 (and the air in the latter chamber is replaced through air supply inlet 86) until sufficient air under pressure has been admitted to load carrying chamber 63 to move piston 72 upward until ball 77 is seated in inlet orifice 73. If there is a decrease in the downward force on piston 72, such as by removing load, balls 77 and 82 interconnected by rod 81 rise together to open exhaust orifice 82 and release air from load carrying chamber 63 until sufficient air has been exhausted to rebalance the new load at the predetermined height.

This embodiment of the invention incorporates all the features of the embodiment of FIG. 1 described above. In addition, it facilitates positioning the platform in any position.

In order to better illustrate the principles of the invention, the embodiments of the invention have been described as providing single-axis leveling and shock isolation along the vertical axis. Such single dimensional systems have numerous practical applications. It is to be understood that the principles of the invention are applicable to fully isolated systems comprising typically three individual pneumatically controlled self-positioning shock and vibration isolators according to the invention. By supporting the isolated body (assumed to be rigid) at three predetermined average vertical positions relative to the local support structure, the isolated body is automatically maintained at a predetermined average angular position about any horizontal axis. The isolators may be employed alone, in parallel with a multiplicity of similar devices or as a master positioning device for a multiplicity of nonposition-controlled pneumatic load supporting devices. Although the isolator according to the invention is normally employed for the purpose of vertically positioning the isolated body, it may also be employed in any orientation in space provided that the isolated body is suitably preloaded in the position sensing direction of the isolator.

There has been described novel pneumatic self-positioning shock and vibration isolators that use relatively few easy-to-fabricate mechanical parts to accomplish excellent shock and vibration isolation with precision leveling. It is evident that those skilled in the art may now make numerous uses and modifications of and departures from the specific embodiments described herein without departing from the inventive concepts. Consequently, the invention is to be construed as embracing each and every novel feature and novel combinations of features present in or possessed by the apparatus and techniques herein disclosed and limited solely by the spirit and scope of the appended claims.

What is claimed is:

1. Self-positioning shock and vibration isolation apparatus comprising, a piston means for supporting a load, means defining a load carrying chamber containing fluid under pressure for supporting said piston means, said piston means having a load carrying platform where a load is to be maintable at a predetermined position and isolated shock and vibration by said apparatus, first valve means for selectively exchanging said fluid between said load carrying chamber and first external means outside said load carrying chamber, said piston means having second valve means for selectively exchanging said fluid between said load carrying chamber and second external means outside said load carrying chamber, said second external means including a source of pressure for maintaining said second valve means normally claimed, said load carrying chamber also being a chamber of said valve means, and plunger means for mechanically interconnecting said first and second valve means in a fixed relative arrangement for maintaining the relative displacement between said piston means and said first valve means at a predetermined average displacement.

2. Self-positioning shock and vibration isolation apparatus in accordance with claim 1 wherein said first and second valve means comprise first and second valve elements respectively, and said mechanically interconnecting means comprises rod means having one of said valve elements mounted on said end thereof.

3. Self-positioning shock and vibration isolation means in accordance with claim 1 and further comprising means defining a bias chamber adjacent to said load carrying chamber and said piston means.

4. Self-positioning shock and isolation vibration apparatus in accordance with claim 1 wherein said first valve means is located on said piston means and said second valve means is supported by means for containing said load carrying chamber.

5. The self-positioning shock and vibration isolation apparatus of claim 1 wherein said piston means carries a load mounting means which is adjustably arranged with respect thereto.

6. The self-positioning shock and vibration isolation means in accordance with claim 3 wherein said piston is provided with overtravel and undertravel mechanical stop means, one of said latter means being located within said bias chamber.

7. The self-positioning shock and vibration isolation means in accordance with claim 6 wherein one wall of said bias chamber forms a portion of both said overtravel and undertravel mechanical stop means.

8. The self-positioning shock and vibration isolation means of claim 1 wherein said first and second valve means are universally mounted so as to permit misalignments of said piston means with respect to said fluid containing chamber means without interfering with the operation of said apparatus.

9. The self-positioning shock and vibration isolation means of claim 8 wherein said first and second valve means comprise spherical valve elements cooperating with tapered valve seats, said valve elements being mechanically interconnected in an immovable manner with respect to one another.

10. Self-positioning shock and vibration isolation apparatus in accordance with claim 1 wherein said piston means bounds a portion of said load carrying chamber and said first and second valve means have first and second valve seats respectively adjacent to opposite sides of said load carrying chamber.

11. Self-positioning shock and vibration isolation apparatus in accordance with claim 10 wherein said mechanically interconnecting means comprises a rod in said load carrying chamber joining respective balls in said first and second valve seats.

12. Self-positioning shock and isolation vibration apparatus in accordance with claim 1 wherein said first valve means forms a portion of one wall of said load carrying chamber, and the pressures in said first and second external means are respectively higher and lower than that in said load carrying chamber.

* * * * *